April 17, 1956  C. E. LION  2,741,849
MEASURING INSTRUMENT
Filed March 6, 1953  2 Sheets-Sheet 1
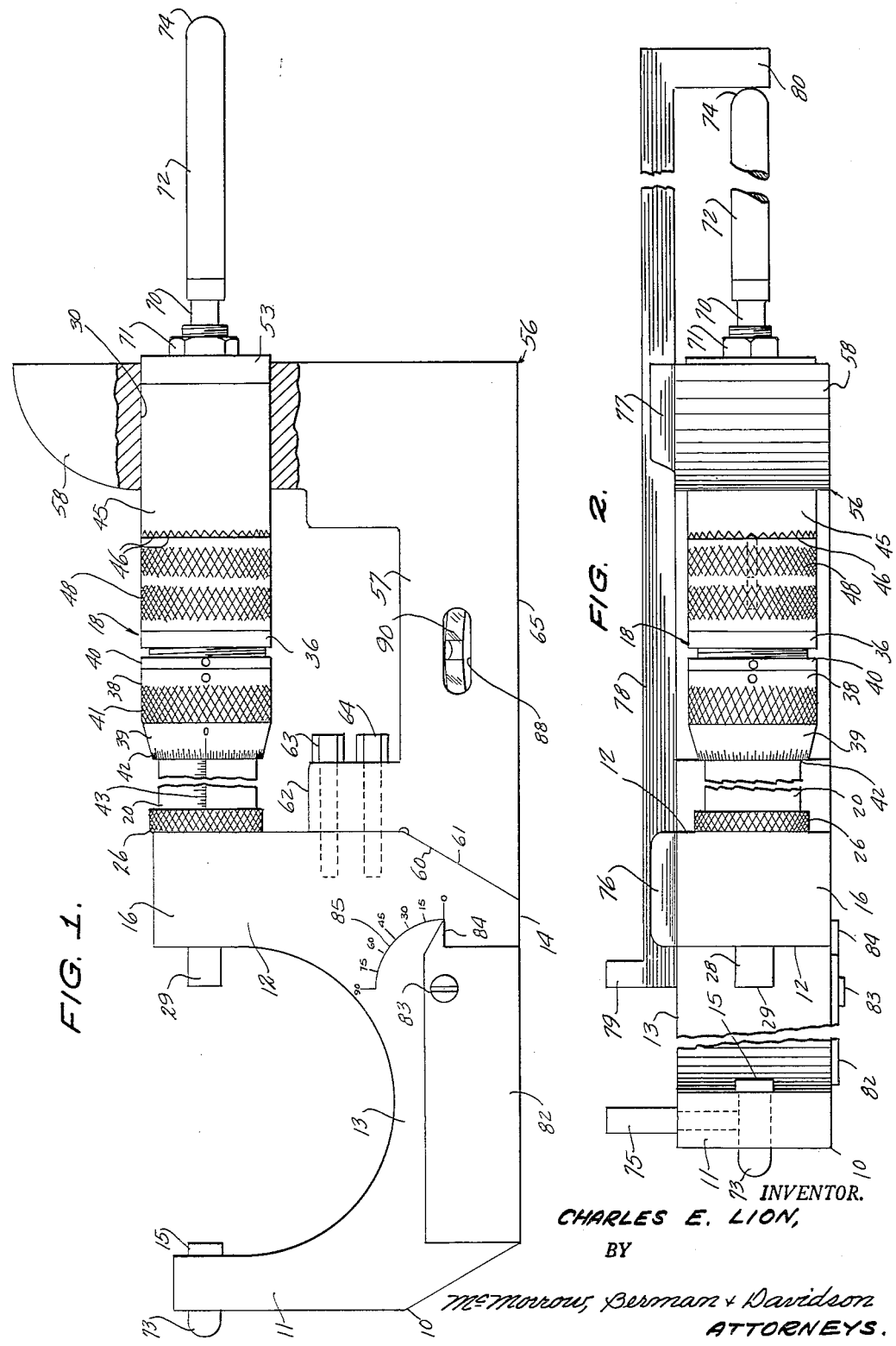
INVENTOR.
CHARLES E. LION,
BY
McMorrow, Berman & Davidson
ATTORNEYS.

April 17, 1956   C. E. LION   2,741,849
MEASURING INSTRUMENT
Filed March 6, 1953   2 Sheets-Sheet 2
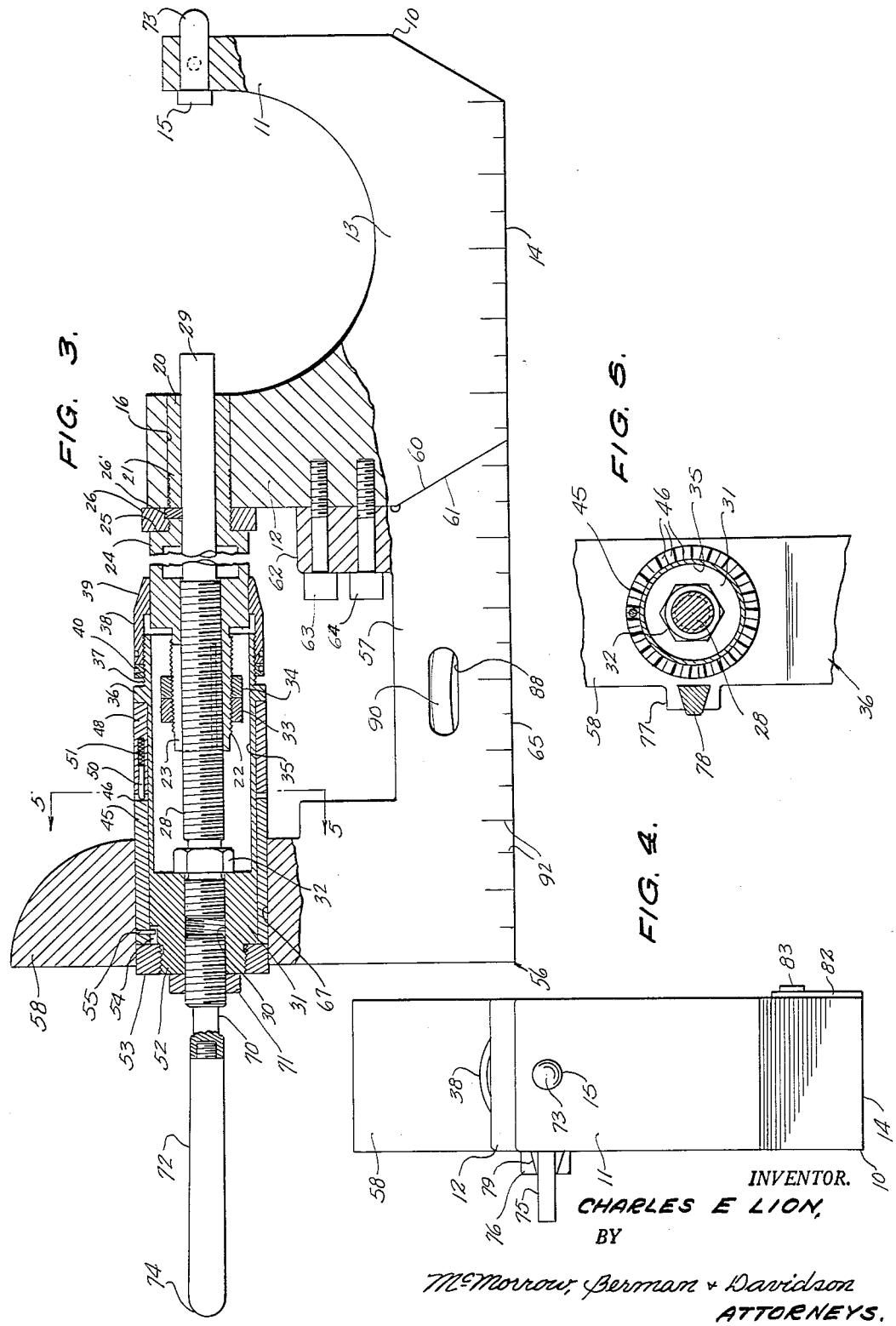
INVENTOR.
CHARLES E. LION,
BY
McMorrow, Berman & Davidson
ATTORNEYS.

United States Patent Office 2,741,849
Patented Apr. 17, 1956

2,741,849

MEASURING INSTRUMENT

Charles E. Lion, St. Marys, Pa.

Application March 6, 1953, Serial No. 340,797

2 Claims. (Cl. 33—167)

This invention relates to measuring instruments, such as micrometers, and more particularly to a micrometer assembly for universal use, having means for taking inside and outside measurements and for measuring angles and lineal distances and indicating departures of a workpiece surface from a horizontal or level condition.

It is among the objects of the invention to provide an improved measuring instrument in which the same micrometer is used for taking both inside and outside measurements; which includes an attachment rendering the device operative to measure both outside and inside dimensions and depth of grooves and other recesses, over a wide range of measurements; which provides a spirit level and a square and a scale of lineal measurement on the square; which includes means for accurately measuring angles; and which is simple and durable in construction, economical to manufacture, and efficient and accurate in use.

Other objects and advantages will become apparent from a consideration of the following description and the appended claims in conjunction with the accompanying drawings, wherein:

Figure 1 is a side elevational view of a measuring instrument illustrative of the invention;

Figure 2 is a top plan view of the instrument as illustrated in Figure 1;

Figure 3 is a partial cross sectional view on the line 3—3 of Figure 2;

Figure 4 is an end elevational view of the instrument looking at the right hand end as shown in Figure 3; and Figure 5 is a fragmentary cross sectional view on the line 5—5 of Figure 3.

With continued reference to the drawings, the numeral 10 designates a C-shaped micrometer frame having spaced apart jaws 11 and 12 and an intermediate or bight portion 13 having on its outer face a flat surface 14. The side faces of the frame 10 are flat and substantially parallel as are also the end surfaces, and an inclined or diagonal surface is interposed between each end surface and the adjacent end of the outer surface 14 of the bight 13 of the frame. A fixed anvil 15 is secured in the jaw 11 near the outer end of the jaw and extends to both the inner and outer sides of the jaw and a micrometer socket 16 is provided in the outer end portion of the jaw 12.

An adjustable micrometer, generally indicated at 18, is mounted at one end in the socket 16 and projects outwardly from the outer surface of the frame jaw 12. This micrometer comprises an inner sleeve 20 having a bore of substantially uniform diameter extending coaxially therethrough and having reduced end portions one of which, as indicated at 21, extends through and is threaded into the socket 16 and the other of which, as indicated at 22, is externally tapered and screw threaded and provided with a longitudinally extending slot 23. The intermediate portion 24 of the inner sleeve 20 provides at its end adjacent the socket 16 an annular shoulder 25 and a locking ring 26 surrounds the reduced end portion 21 of the inner sleeve between the shoulder 25 and the adjacent surface of the socket 16.

An externally screw threaded stem 28 extends through the bore of the inner sleeve 20 and is threaded through the internally screw threaded portion 22 of the inner sleeve. At one end this stem projects through the reduced end portion 21 of the inner sleeve into the space between the jaws 11 and 12 to provide a movable anvil 29 opposed to the fixed anvil 15 mounted in the jaw 11 of the micrometer frame and at its other end this stem is threaded into the screw threaded bore 30 of a cylindrical plug 31. A nut formation 32 on the stem 28 adjacent the end thereof threaded into the plug 31 bears against the adjacent or inner surface of the plug to positively position the plug relative to the stem and to lock the stem in adjusted position in the plug.

A pair of lock nuts 33 and 34 are threaded onto the tapered end portion 22 of the inner sleeve and are adjustable along this tapered end portion to take up any wear between the internally screw threaded portion of the bore of the inner sleeve and the externally screw threaded stem 28.

The locking ring 26 has an internal cam surface bearing on a brake element 26' mounted in a recess in the inner sleeve 20 and bearing on the stem 28. The ring 26 can be partially rotated around the inner sleeve to lock the stem 28 in selected positions of adjustment relative to the inner sleeve to retain a measurement as a reference and to free the stem for movement as desired.

An intermediate sleeve 35 is joined at one end to the plug 31 with its outer cylindrical surface continuous with the outer cylindrical surface of the plug 31, and extends from this plug toward the intermediate portion 24 of the inner sleeve 20 in surrounding relationship to the stem 28, and an annular flange or bead 36 is formed on the intermediate sleeve 35 between the plug 31 and the intermediate portion 24 of the inner sleeve 20.

The portion of the intermediate sleeve 35 between the annular bead formation 36 and the intermediate portion 24 of the inner sleeve is externally screw threaded, as indicated at 37, and a cylindrical collar 38 has an internally screw threaded portion threaded onto this end portion of the intermediate sleeve and a tapered end portion 39 closely surrounding the intermediate portion 24 of the inner sleeve 20. The collar is retained in adjusted position on the intermediate sleeve by a lock nut 40 threaded onto the intermediate sleeve and bearing against the end of the cylindrical collar 38 nearest the annular bead 36 on the intermediate sleeve and the collar 38 may be externally knurled or roughened, as indicated at 41 in Figure 1. The tapered end portion 39 of the collar 38 is provided with a series of indicia 42 extending therearound and the intermediate portion 24 of the inner sleeve 20 is provided with a longitudinally extending series of indicia 43 which cooperate with the edge of the tapered portion 39 of the collar 38 with the indicia 42 on the collar to provide a vernier scale for indicating the exact distance in thousands or ten-thousands of an inch between the opposite ends of the fixed anvil 15 and the movable anvil 29.

An outer sleeve 45 surrounds the plug 31 and the adjacent portion of the intermediate sleeve 35 and the end of this outer sleeve nearest the annular bead formation 36 on the intermediate sleeve is provided with an annular series of serrations 46. A cylindrical band 48 is secured on the intermediate sleeve 35 at the side of the annular bead formation 36 nearest the outer sleeve 45, and this band carries one or more plungers 50 disposed in longitudinally extending bores therein and engaging at their outer ends the serrations 46 on the outer sleeve 45. These plungers are resiliently pressed into engagement with the serrations 46 by springs, as indicated at 51, disposed one in each plunger-receiving bore between the inner end of the plunger and the inner end of the bore, as illustrated in Figure 3.

The plug 31 is provided on its end remote from the intermediate sleeve 35 with an externally screw threaded end portion 52 of reduced diameter and a nut 53 is threaded onto the end portion 52 of the plug and bears against an annular shoulder 53' on the plug 31 and the adjacent end of the outer sleeve 45, this nut together with the annular bead formation 36 and the band 48 maintaining the outer sleeve 45 in adjusted position longitudinaly of the intermediate sleeve 35 and plug 31. A notch 54 is provided in the outer surface of the plug 31 at the inner end of the reduced end portion 52, and a pin 55 projects from the outer sleeve 45 into the notch 54 and positively holds the outer sleeve 45 against rotational movement relative to the plug 31 and intermediate sleeve 35.

In using the micrometer the intermediate sleeve 35, plug 31 and screw threaded stem 28 are rotated as a unit relative to the frame 10 and inner sleeve 20 by manually rotating the band 48. When the opposed ends of cooperating fixed and movable anvils, such as the anvils 29 and 15, of the device are brought into contact with the opposite surface of a workpiece being measured, the band 48 will rotate relative to the sleeves 45 and 35 as soon as enough pressure is applied to overcome the torsional resistance of the engagement of the plunger 50 with the serrations 46, and the pressure exerted by the opposed anvils on the workpiece will thus be limited to a value which will not cause any variation in repeated measurements of the same dimension.

With this arrangement, when the band 48 is manually rotated around the intermediate portion 24 of the inner sleeve 20 the screw threaded stem 28 is simultaneously rotated in the bore of the inner sleeve and is threaded longitudinally of the inner sleeve moving its end 29 adjacent the fixed anvil 15 toward or away from the fixed anvil to receive an object to be measured between the inner end of the fixed anvil 15 and the opposed end 29 of the stem 28. The indicia 42 and 43 on the collar 38 and intermediate portion 24 of the inner sleeve 20 will then indicate the exact distance between the opposed ends of the anvil 15 and the stem 28.

A support in the form of a square, generally indicated at 56, having legs 57 and 58 disposed at right angles to each other, is secured to the micrometer frame 10. The leg 57 of the square has at one end an inclined surface 60 which bears against the inclined surface 61 between the outer surface of the leg 12 of the frame 10 and the outer frame surface 14 of the intermediate portion 13 of the frame and this leg also has an inwardly projecting, apertured lug 62 overlying the adjacent portion of the outer surface of the leg 12 of the micrometer frame. Bolts 63 and 64 extend through spaced apart apertures in the lug 62 of the square and are threaded into tapped holes in the leg of jaw 12 of the micrometer frame to rigidly secure the square to the frame in position such that the outer surface 65 of the leg 57 of the square is continuous with the outer surface 14 of the intermediate portion 13 of the micrometer frame.

Intermediate its length the leg 58 of the square is provided with an aperture 67 extending therethrough and the outer sleeve 45 of the micrometer extends through this aperture of the leg 58 of the square.

A tip socket 70 is threaded at one end into the bore 30 of the plug 31 and projects from the end of the plug 31 remote from the micrometer frame 10 and a lock nut 71 threaded onto this tip socket secures the socket firmly in adjusted position relative to the plug 31. A tip 72 is secured at one end to the outer end of the socket 70 and extends from the socket longitudinally of the socket and coaxially of the socket and the stem 28.

The fixed anvil 15 extends entirely through the jaw 11 of the micrometer frame 10 and is provided at the outer side of the jaw 11 with a rounded end 73 which cooperates with the rounded outer end 74 of the tip 72 to take inside measurements of objects of sufficient diameter to receive the micrometer, the square and the tip therein. The tip 72 is provided in different lengths to accommodate the measuring instrument to hollow objects of different internal diameters, and it is to be understood that a known dimension will be added to the micrometer reading when the micrometer is used, in the manner indicated above, to measure inside dimensions of hollow objects. By placing the outer surface of the square leg 58 on a flat workpiece surface and the tip 72 in a recess, groove or depression in the workpiece, the micrometer can also be used to measure the depth of the recess, groove or depression in the workpiece.

Means are also provided to measure the internal dimension of objects which do not have an internal diameter sufficient to receive the micrometer and square therein and for this purpose and for measuring the external dimensions of objects too large to be received between the movable and fixed abutments 29 and 15.

An abutment pin 75 projects from one side of the frame jaw 11 with its longitudinal center line perpendicular to the longitudinal center line of the fixed anvil 15, a guide 76 is provided on the corresponding side of the jaw 12 of the micrometer frame 10, this guide having an opening with undercut sides extending therethrough longitudinally of the micrometer and square assembly, and a similar guide 77 is provided on the leg 58 of the square 56 and is also provided with an opening extending longitudinally of the square and micrometer assembly and provided with undercut sides.

An adapter bar 78 having beveled side edges is slidably mounted in the guides 76 and 77 for longitudinal movement relative to the micrometer and square assembly and this adaptor bar has on its end adjacent the abutment pin 75 an outwardly projecting abutment pin 79 which is functionally opposed to the abutment pin 75 to measure internal dimensions of hollow objects in which both of the abutment pins are disposed or the external dimensions of objects disposed between the abutment pins. At its opposite end the adaptor bar 78 is provided with a perpendicularly extending abutment 80 which overlies and contacts the rounded outer end 74 of the tip 72 so that the adaptor bar 78 is moved longitudinally of the micrometer and square assembly as the tip 72 is moved longitudinally of this assembly by the threading of the stem 28 through the fixed inner sleeve 20 upon rotational movement of the intermediate sleeve 35 and the plug 31 by the band 48. It will be noted that the outer sleeve 45 is rotatable in the aperture 67 in the leg 58 of the square 56 and is also longitudinally movable through this aperture as the outer sleeve is carried by the intermediate sleeve.

Adaptor bars 78 of different lengths may be provided for mounting in the guideways 76 and 77 of the device to accommodate the measuring instrument to objects of different sizes or, if desired, additional abutments, such as the abutment 79, may be provided on the bar 78 at locations spaced apart predetermined distances therealong and may be selectively used for objects of different internal diameters. Different known factors will, of course, be added to the micrometer readings when the device is used to measure internal or external dimensions in the manner described above.

A blade 82 of rectangular shape is pivotally mounted adjacent one corner thereof on the intermediate portion 13 of the micrometer frame 10 by a pivot screw 83 so that one longitudinal edge thereof can be aligned with the flat outer surface 14 of the intermediate portion 13 of the frame. A pointer 84 projects from the corner of the blade 82 adjacent the pivot screw 83 and cooperates with a scale 85 of angular measurement provided on the adjacent side of the micrometer frame 10 to indicate the angularity between the flat outer surface 14 of the micrometer frame and the adjacent flat outer surface 65 of the leg 57 of the square 56 so that the instrument can be used to measure selected angles as well as right angles.

The leg 57 of the square 56 is provided intermediate its length with an opening 88 extending therethrough from one side to the other and a spirit level tube 90 is mounted in the opening 88 of the square so that the departure of a surface from a horizontal condition can be determined by the instrument.

A scale 92 of lineal measurement is provided along one side surface of the frame 10 and square 56 adjacent the outside surface 14 of the frame and the corresponding surface 65 of the square for single measurement of lineal dimensions.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A measuring instrument comprising a frame having spaced apart jaws, a micrometer assembly mounted in one of said jaws and having a stem projecting from opposite ends thereof with one end of said stem facing the other one of said jaws, said stem being movable toward and away from said other jaw, an abutment pin projecting transversely from one side face of said frame adjacent the end of said other jaw, a guideway extending longitudinally along said one side face of said frame adjacent the end of said one jaw, an adaptor bar arranged longitudinally of said frame and slidable in said guideways, a first abutment projecting from one end of said bar in parallel relation with respect to said abutment pin, and a second abutment projecting from the other end of said bar and abutting the other end of said stem.

2. A measuring instrument comprising a frame having spaced apart jaws, a support arranged longitudinally of said frame and secured thereto, a micrometer assembly mounted in said support and in one of said jaws and having a stem projecting from opposite ends thereof with one end of said stem facing the other one of said jaws, said stem being movable toward and away from said other jaw, an abutment pin projecting transversely from one side face of said frame adjacent the end of said other jaw, a first guideway extending longitudinally along said one side face of said frame adjacent the end of said one jaw, a second guideway extending longitudinally along said support in spaced aligned relation with respect to said first guideway, an adaptor bar aranged longitudinally of said frame and slidable in said guideways, a first abutment projecting from one end of said bar in parallel relation with respect to said abutment pin, and a second abutment projecting from the other end of said bar and abutting the other end of said stem.

References Cited in the file of this patent

UNITED STATES PATENTS

| | | |
|---|---|---|
| 361,056 | Emery | Apr. 12, 1887 |
| 1,070,816 | Kunik | Aug. 19, 1913 |
| 1,307,816 | Garbin | June 24, 1919 |
| 1,333,453 | Sardo et al. | Mar. 9, 1920 |
| 1,511,255 | Barker | Oct. 14, 1924 |
| 2,193,939 | Sanford | Mar. 19, 1940 |
| 2,421,440 | Thorpe | June 3, 1947 |
| 2,576,606 | Kausti | Nov. 27, 1951 |

FOREIGN PATENTS

| | | |
|---|---|---|
| 241,026 | Switzerland | June 1, 1946 |